United States Patent
Livens (10) Patent No.: US 10,323,984 B2
(45) Date of Patent: Jun. 18, 2019

(54) METHOD AND SYSTEM FOR ESTIMATING AN INPUT SPECTRUM FROM SENSOR DATA

(71) Applicant: VITO NV, Mol (BE)

(72) Inventor: Stefan Livens, Mol (BE)

(73) Assignee: VITO NV, Mol (BE)

( * ) Notice: Subject to any disclaimer, the term of this patent is extended or adjusted under 35 U.S.C. 154(b) by 0 days.

(21) Appl. No.: 15/540,441

(22) PCT Filed: Feb. 3, 2016

(86) PCT No.: PCT/EP2016/052313
§ 371 (c)(1),
(2) Date: Jun. 28, 2017

(87) PCT Pub. No.: WO2016/124659
PCT Pub. Date: Aug. 11, 2016

(65) Prior Publication Data
US 2017/0363473 A1     Dec. 21, 2017

Related U.S. Application Data

(60) Provisional application No. 62/111,291, filed on Feb. 3, 2015.

(30) Foreign Application Priority Data

Feb. 3, 2015 (GB) .................................. 1501731.2

(51) Int. Cl.
*G01B 9/02*     (2006.01)
*G01J 3/45*     (2006.01)
(Continued)

(52) U.S. Cl.
CPC . *G01J 3/45* (2013.01); *G01J 3/26* (2013.01); *G01J 3/28* (2013.01); *G01J 3/2803* (2013.01);
(Continued)

(58) Field of Classification Search
CPC .... G01J 3/45; G01J 3/26; G01J 3/2823; G01J 3/2826; G01J 2003/2879
(Continued)

(56) References Cited

U.S. PATENT DOCUMENTS

| 6,049,762 A | 4/2000 | Ganz et al. |
| 2012/0327248 A1 | 12/2012 | Tack et al. |
| 2016/0132748 A1* | 5/2016 | Tillotson ............... B64C 39/024 348/222.1 |

FOREIGN PATENT DOCUMENTS

| CN | 102741671 A | 10/2012 |
| CN | 104007528 A | 8/2014 |

(Continued)

OTHER PUBLICATIONS

International Search Report (ISR) dated May 24, 2016, for PCT/EP2016/052313.

(Continued)

*Primary Examiner* — Tarifur R Chowdhury
*Assistant Examiner* — Jonathon Cook
(74) *Attorney, Agent, or Firm* — Bacon & Thomas, PLLC (57) ABSTRACT

A method for estimating an input spectrum from sensor data acquired by an optical sensor assembly, having an aperture, a Fabry-Perot interferometer, and an optical sensor element, the method including: obtaining first calibration data representative of a spectral response function of the optical sensor assembly for a first setting of the aperture; computing second calibration data from the first calibration data, the second calibration data being representative of a spectral response function of the optical sensor assembly for a second setting of the aperture, where the second setting corresponds to a setting applied during the acquiring of the sensor data; and estimating the input spectrum as a function of the second calibration data and the sensor data. Addition- (Continued)

ally, a corresponding system for estimating an input spectrum.

8 Claims, 5 Drawing Sheets

(51) Int. Cl.
 *G01J 3/26* (2006.01)
 *G01J 3/28* (2006.01)
(52) U.S. Cl.
 CPC ..... *G01J 3/2823* (2013.01); *G01J 2003/2826* (2013.01); *G01J 2003/2879* (2013.01)
(58) Field of Classification Search
 USPC ........................................................ 356/454
 See application file for complete search history.

(56) References Cited

FOREIGN PATENT DOCUMENTS

| CN | 104034418 A | 9/2014 |
|---|---|---|
| WO | 2011/064403 A1 | 6/2011 |
| WO | 2011/073430 A1 | 6/2011 |

OTHER PUBLICATIONS

Written Opinion dated May 24, 2016, for PCT/EP2016/052313.
British Search Report dated Jul. 16, 2015, for GB 1501731.2.
Tack et al., "A compact, high-speed and low-cost hyperspectral imager", Silicon Photonics VII, SPIE, vol. 8266, No. 1, Feb. 9, 2012.
Heikki Saari, "Properties and Calibration of MEMS and Piezoactuated Fabry-Perot Spectral Imagers", EUFAR Joint Expert Working Group Meeting: Imaging Spectroscopy Sensors, Calibration/Validation, and Data Processing, Edinburgh, UK, Apr. 14, 2011.
Chinese Office Action in corresponding Chinese Application No. 201680008436.2, dated Mar. 27, 2019.
European Office Action in corresponding European Application No. 16705737.1-1020, dated Apr. 4, 2019.

* cited by examiner

METHOD AND SYSTEM FOR ESTIMATING AN INPUT SPECTRUM FROM SENSOR DATA

The present invention pertains to optical sensor assemblies, and in particular to calibration of multispectral or hyperspectral optical sensor assemblies. Accordingly, the invention provides a method and system for estimating an input spectrum from a measured spectrum.

BACKGROUND OF THE INVENTION

Known optical sensor assemblies may comprise an aperture, a Fabry-Perot interferometer or etalon, and an optical sensor element. The term "optical sensor element" is used herein to designate an array of light-sensitive pixels, such as CMOS pixels.

The Fabry-Perot interferometer has a narrow transmission band, the center wavelength of which depends on its thickness. In the assembly described above, the purpose of the Fabry-Perot interferometer is to reduce the transmission of light onto the sensor outside the wavelength band of interest. The Fabry-Perot interferometer may have different properties (in particular, different thickness) for different corresponding regions of the optical sensor element, so as to obtain a multispectral or hyperspectral sensor assembly. An example of a hyperspectral sensor assembly obtained in this manner is disclosed in international patent application publication WO 2011/064403 A1. A further example of such a sensor assembly, combined with a second sensor element on the same substrate, is disclosed in international patent application publication WO 2011/073430 A1 in the name of the present applicant.

It is a disadvantage of the known optical sensor assemblies, that precise spectral characterization is a complex and time consuming task.

SUMMARY OF THE INVENTION

Optical systems capture light emitted or reflected by physical objects with non-zero dimensions, which passes through an aperture with a non-zero diameter. As a result, the rays of light reaching the sensor through the aperture will have passed through the Fabry-Perot interferometer under a range of different angles. The range further depends on the chosen aperture setting.

The spectral response of a Fabry-Perot interferometer depends on the angle of incidence of the incident light. It is therefore an aspect of the known optical sensor assemblies that the spectral response curve changes with varying aperture sizes. To deal with this aperture-dependence of the spectral response curve, it is necessary to calibrate the optical system by measuring the spectral response for a particular aperture setting, and repeating this over the total useful range of aperture sizes. Once the optical sensor is put to use, any acquired image is corrected by selecting the correct calibration measurements that correspond to the aperture setting used for the new acquisition.

The calibration process is cumbersome and must be performed for each series of optical sensor assemblies with substantially the same geometric properties. In multispectral or hyperspectral sensor assemblies, the system must be calibrated for each of the wavelength bands. The computer or processor used to perform the correction of the subsequently acquired images must have access to the different respective calibration curves for all possible aperture settings.

It is an object of the present invention to facilitate the calibration process and/or to render the correction process more efficient.

According to an aspect of the present invention, there is provided a method for estimating an input spectrum from sensor data acquired by means of an optical sensor assembly, the optical sensor assembly comprising an aperture, a Fabry-Perot interferometer, and an optical sensor element, the method comprising: obtaining first calibration data representative of a spectral response function of the optical sensor assembly for a first setting of the aperture; computing second calibration data from the first calibration data, the second calibration data being representative of a spectral response function of the optical sensor assembly for a second setting of the aperture, wherein the second setting corresponds to a setting applied during the acquiring of the sensor data; and estimating the input spectrum as a function of the second calibration data and the sensor data.

It is an advantage of the method according to the present invention that calibration data only has to be available for a single aperture setting. Corresponding calibration data for other aperture settings that may be used in subsequent image acquisition can be computed as needed from the available calibration data.

While the invention is described with reference to first calibration data and second calibration data, it is not limited to the use of a set of measurements for a single setting of the aperture (first calibration data) as the input for the computation of the second calibration data. In particular, the method may be used in two ways:
- using a set of measurements for a single aperture, and computing the responses for all other aperture settings;
- using multiple sets of measurements, which represent a subset of all aperture values intended to be used, and computing the response for intermediate aperture values (physics-based interpolation using the model as above) and for aperture values outside the measured range (extrapolation as above).

In an embodiment of the method according to the present invention, the obtaining of the first calibration data comprises measuring a spectral response of the optical sensor assembly to a plurality of calibrated light sources for the first setting of the aperture.

The actual calibration step may be part of embodiments of the present invention. However, once the initial calibration has been performed, the optical sensor assembly may continue to operate with the acquired calibration data.

In an embodiment of the method according to the present invention, the Fabry-Perot interferometer comprises a plurality of parts with different spectral properties overlaying respective regions of the sensor element, and the obtaining of the first calibration data comprises obtaining respective calibration data sets for the plurality of regions.

It is an advantage of this embodiment that the invention can be applied to multispectral and hyperspectral sensors.

In an embodiment of the method according to the present invention, the first calibration data is represented as a first matrix, and wherein the computing of the second calibration data comprises performing a matrix multiplication on the first matrix to obtain a second matrix representing the second calibration data.

As will be shown below, matrix multiplication is a computationally efficient way to perform the conversion from the first calibration data to the second calibration data.

According to an aspect of the present invention, there is provided a computer program product comprising code means configured to carry out the method described above.

According to an aspect of the present invention, there is provided a system for estimating an input spectrum from sensor data acquired by means of an optical sensor assembly having an aperture, the system comprising: interfacing means configured for acquiring the sensor data, and first calibration data representative of a spectral response function of the optical sensor assembly for a first setting of the aperture; and processing means configured for computing second calibration data from the first calibration data, the second calibration data being representative of a spectral response function of the optical sensor assembly for a second setting of the aperture, wherein the second setting corresponds to a setting applied during the acquiring of the sensor data, and for estimating the input spectrum as a function of the second calibration data and the sensor data.

In an embodiment, the system according to the present invention further comprises the optical sensor assembly, the optical sensor assembly comprising an aperture, a Fabry-Perot interferometer, and an optical sensor element.

The technical effects and advantages of embodiments of the computer program product and the system according to the present invention correspond, mutatis mutandis, to those of the corresponding embodiments of the method according to the present invention.

BRIEF DESCRIPTION OF THE FIGURES

These and other technical effects and advantages of embodiments of the present invention will now be described in more detail with reference to the accompanying drawings, in which.

DETAILED DESCRIPTION OF EMBODIMENTS THE INVENTION

Multispectral imaging and hyperspectral imaging are forms of spectral imaging wherein information from across the electromagnetic spectrum is collected in various spectral bands and processed. Hyperspectral imaging deals with narrow spectral bands over a contiguous spectral range. Multispectral imaging deals with a more limited number of bands, each of which can be narrow or more broad, where the set of bands does not need to cover a contiguous range but can also contain discrete bands.

From the different spectral images that are collected, information of the objects that are imaged can be derived. For example, as certain objects leave unique spectral signatures in images which may even depend on the status of the object, information obtained by multispectral imaging can provide information regarding the presence and/or status of objects in a region that is imaged. After selection of a spectral range that will be imaged, as spectral images in this complete spectral range can be acquired, one does not need to have detailed prior knowledge of the objects, and post-processing may allow to obtain all available information.

Known hyperspectral sensor assemblies, such as the ones disclosed in WO 2011/064403 A1 and WO 2011/073430 A1, combine a 2-dimensional array of light sensitive pixels with a Fabry-Perot interferometer whose thickness varies from one region of the array to the next. Thus, different parts of the sensor element are sensitive to different wavelength bands.

Figure 1:
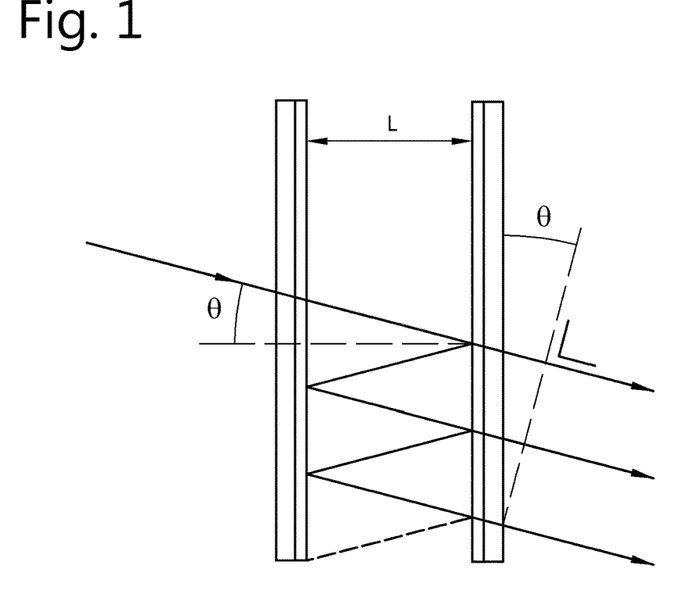
FIG. 1 illustrates the principle of operation of a Fabry-Perot interferometer.

A Fabry-Perot interference filter consists of a cavity between two reflecting surfaces, as depicted in FIG. 1. Incoming light is reflected at the surfaces. After multiple reflections constructive interference occurs for narrow spectral bands and thus mostly light of very specific wavelengths A passes through the filter. Transmission is maximal if the phase difference δ is an integer number:

$$\delta = \left(\frac{2\pi}{\lambda}\right) 2nL\cos\theta \quad \text{(Equation 1)}$$

For a given refractive index n of the material between the reflecting surfaces, the thickness L of the cavity determines the central wavelength for which the filter has its peak transmission.

The transmission decreases for other wavelengths:

$$T = \frac{1}{1 + F\sin^2\delta} \quad \text{(Equation 2)}$$

The transmission is governed by the reflectivity R through the intermediate quantity F (coefficient of finesse).

$$F = \frac{4R}{(1-R)^2} \quad \text{(Equation 3)}$$

Figure 2:
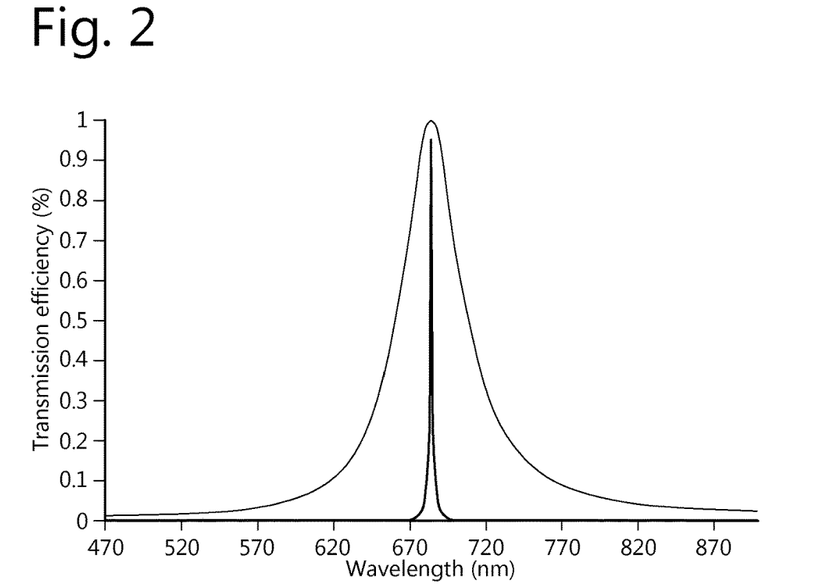
FIG. 2 illustrates the overall shape of a Fabry-Perot response peak and the effect of different R values.

The overall shape of a Fabry-Perot response peak and the effect of different R values is depicted in FIG. 2, where the narrow curve represents R=0.99 and the wider curve represents R=0.8. The Fabry-Perot response peak approaches a Lorentz curve (which has the functional form $$\frac{1}{1+x^2}\bigg)$$

for small δ because sin δ≈δ.

The width of the spectral response peak (FWHM) is also determined by R. It is approximately given by the following equation.

$$FWHM = \frac{2}{\sqrt{F}} \quad \text{(Equation 4)}$$

Figure 3:
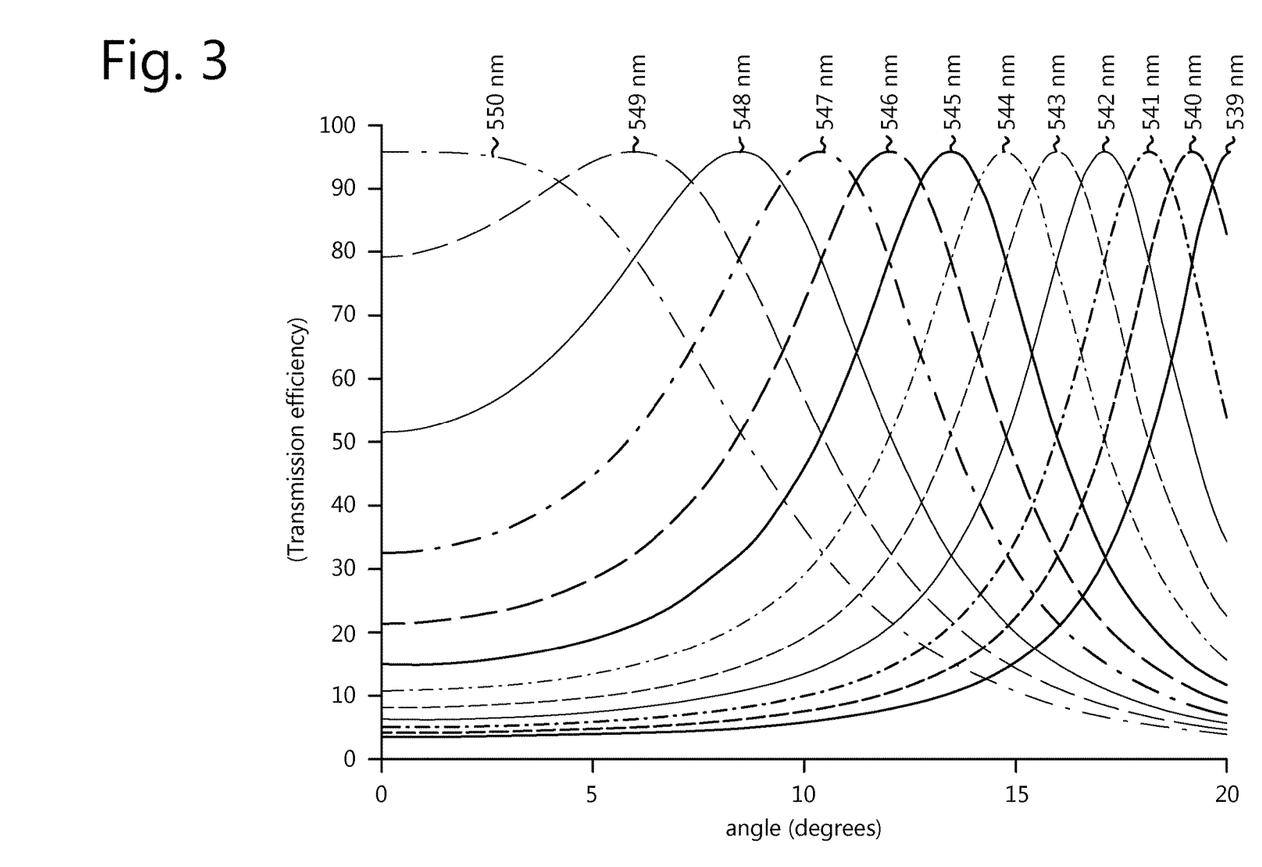
FIG. 3 illustrates the shift of the transmission peak of a Fabry-Perot interferometer with a varying angle of incidence.

The central wavelength depends on the angle of incidence θ (cfr. Equation 1). For a given filter, the peak transmission is for the longest wavelength at normal incidence, and shifts towards shorter wavelengths with increasing angle of incidence. This shift is shown in FIG. 3.

Figure 4:
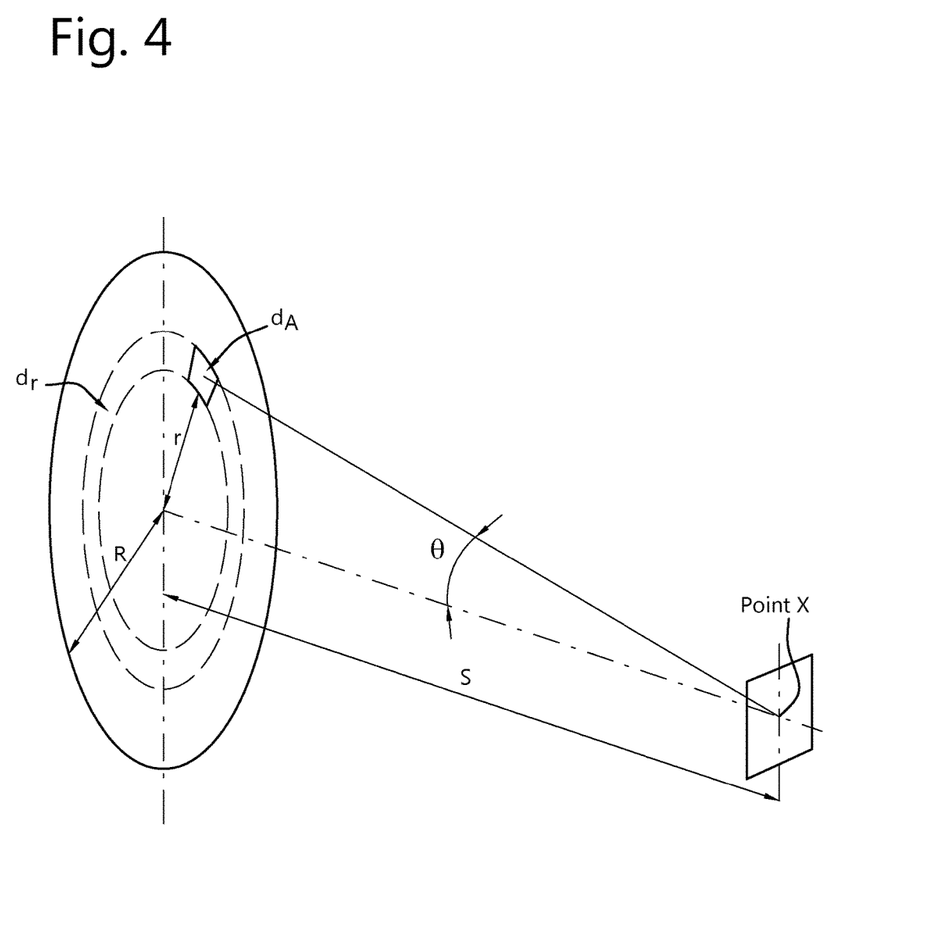
FIG. 4 schematically illustrates the domain of the angles of incidence over which the spectral response at a given point of the optical sensor element must be integrated.

The spectral responses as discussed above are only valid for light under a single angle of incidence. In practice, any optical instrument, through its optics, gathers light from a range of directions. Unless telecentric lenses are used, the light reaches the filter with a range of different angles. The overall spectral response is then the integration of the responses for the various angles over the cone of incidence, as schematically shown in FIG. 4.

Figure 5:
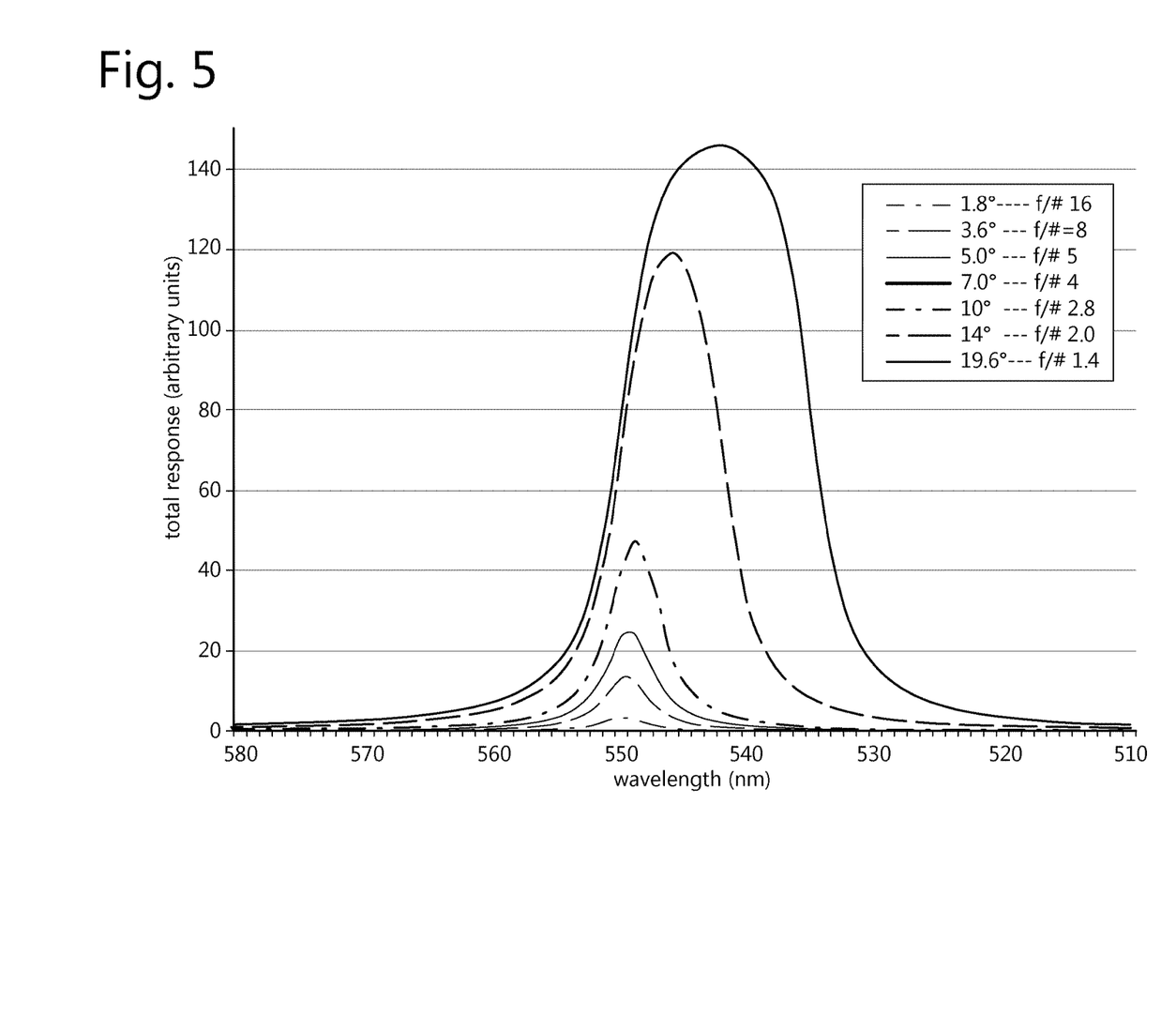
FIG. 5 schematically illustrates the aperture-dependence of the spectral response of a Fabry-Perot interferometer.

As the cone of incidence becomes wider with increasing aperture size, the spectral response function is also aperture-dependent. The resulting spectral response function for a range of apertures (between f16 and f1.4) is shown in FIG. 5.

As a result of this aperture-dependent effect, it becomes necessary to carry out calibration measurements of optical sensor assemblies for all possible aperture settings that could be applied to the assembly.

Embodiments of the present invention are based on the insight of the inventors that a spectral response function of an optical sensor assembly including a Fabry-Perot interferometer, as obtained for a given aperture value, can be converted from and to a spectral response function for any other aperture value by using a model of the aperture effect.

If a given Fabry-Perot etalon has a (measured) spectral response function $SRF(\lambda)$, the spectral response $R(\lambda)$ to an input spectrum $s(\lambda)$ can be obtained by integration:

$$R(\lambda) \int SRF(\lambda)s(\lambda)d\lambda \quad \text{(Equation 5)}$$

In practice, in multispectral or hyperspectral sensors, image acquisition is performed for a number of discrete wavelength bands, and calibration is performed by means of a set of discrete measurements. Thus, Equation 5 can conveniently be rewritten in matrix form. The effect of the filter can then be modeled by arranging samples of the spectral response function into a matrix SRF in which every row (k) represents the spectral response function of a particular spectral band, and every column (i) represents the responses at a particular wavelength for all spectral bands. For a sampled input spectrum $s_i$, the band responses can be calculated by matrix multiplication:

$$R_k = SRF_{k,i} \cdot s_i \quad \text{(Equation 6)}$$

By expressing the spectral response function in the matrix form as illustrated in Equation 6, it is possible to calculate an estimate for the response matrix $SRF_{est}(A_x)$ for a particular aperture setting $A_x$ on the basis of one or more measured response matrices $SRF_{meas}(A_i)$. In general, measured response matrices $SRF_{meas}(A_i)$ are known for a limited subset of all possible apertures $A_i$. Hence, the following cases can be distinguished:

Measured Aperture: If $A_x$ equals one of the measured apertures $A_i$, the measured response matrix is used without adaptation: $SRF_{est}(A_x) = SRF_{meas}(A_i)$.

Extrapolation: If $A_x$ is strictly greater than or strictly less than all measured $A_i$, extrapolation is applied. This is the default case if only a single measured matrix $SRF_{meas}(A_i)$ is available, and $A_x \neq A_i$. The data of the closest aperture $A_n$ is used as a starting point, and converted using the optics model, as explained in more detail below Interpolation: If more than one measured response matrix is available, the aperture $A_x$ of a requested response matrix can fall between two measured values ($A_r < A_x < A_s$), in which case interpolation can be applied, as explained in more detail below.

The mathematical basis for the interpolation and extrapolation is as follows. To reconstruct the original spectrum from the measured one, we invert Equation 6.

$$\hat{s}_i = (SRF^{-1})_{i,k} \cdot R_k \quad \text{(Equation 7)}$$

In practice the matrix inversion is unstable, so a suitable regularization method needs to be used (see V. MOREAU et al., *Development of a compact hyperspectral/panchromatic imager for management of natural resources*, The 4S Symposium, June 2012, Portoro, Slovenia). The regularization starts with performing singular value decomposition on the SRF matrix:

$$SRF = U\Sigma V^T \quad \text{(Equation 8)}$$

where U and V are orthogonal matrices, and $\Sigma$ is a diagonal matrix containing the singular values $\sigma_i$. The (pseudo-)inverse of the SRF matrix is obtained as:

$$SRF^{-1} = V\Sigma^{-1}U^T \quad \text{(Equation 9)}$$

in which $\Sigma^{-1}$ is the diagonal matrix with values $1/\sigma_i$ on the diagonal. The solution of Equation 9 is still unstable, but this can be resolved by modifying the values of $\Sigma^{-1}$ to $(\sigma_i/(\alpha + \sigma_i^2))$, so that the contributions of the small eigenvalues are dampened.

It is noted that the spectral sampling of the reconstructed output spectrum does not have to be the same as the SRF sampling. The output sampling is preferably coarser than the sampling of the measured spectral bands. In such cases, it is necessary to resample to the output sampling, which operation may also be expressed as a matrix multiplication.

The above development has shown that with a given set of discretized spectral response functions, it is mathematically possible to estimate an input spectrum from the observed (measured) output spectra. The inventors have found that by judiciously using the physics represented by FIGS. 4 and 5, it is no longer necessary to have separate measured sets of discretized spectral response functions for different aperture settings, as will be explained below.

The spectral response functions of a set of Fabry-Perot filters with given central frequencies and FWHM, such as those used in an integrated multispectral or hyperspectral sensor assembly, can be modeled using the theoretical peak shapes as shown in FIG. 2, discretized, and presented as a matrix: $SRF_{k,i}$. Likewise, it is possible to model the spectral response functions of this same set of Fabry-Perot filters, using the peak shapes as shown in FIG. 5, to include the aperture effect for a given aperture, which may be presented as a second matrix $SRF'_{k,i}$. Given these modeled SRF matrices, the aperture optics effect $T_x$ of a given aperture setting x can be isolated mathematically:

$$T_x = SRF^{-1} \cdot SRF' \quad \text{(Equation 10)}$$

Such a matrix can be constructed for any aperture value. Hence, by using suitable forward and inverse matrices (cfr. Equations 8 and 9), spectra can be converted from and to any aperture value. This insight can be used to convert spectra to a common aperture value.

Given this insight, it suffices to carry out the calibration measurement to obtain a measured, sampled version of the spectral response frequencies with a single aperture, in order to calculate estimates for other aperture values by means of extrapolation. When a measured output spectrum is to be converted to an estimated input spectrum, it suffices to matrix-multiply the calibration SRF matrix with the appropriate $T_x$ matrix for the aperture that was used in the subsequent measurement, and to use the adjusted SRF for inversion (Equations 8 and 9) and substitution into Equation 7.

The extrapolation procedure can thus be summarized as follows:
calculate the theoretical response matrices for $A_x$ and $A_n$:
$SRF_{mod}(A_x)$, $SRF_{mod}(A_n)$;
calculate the conversion matrix:

$$T(A_x \to A_c) = (SRF_{mod}(A_n))^{-1} * SRF_{mod}(A_x)'$$

where * represents ordinary matrix multiplication and $(\;)^{-1}$ represents the matrix (pseudo)-inverse
the estimated response matrix becomes:

$$SRF_{est}(A_x) = T(A_x \to A_n) * SRF_{meas}(A_n)$$

This formula allows to calculate estimated response matrices from a single measured response matrix SRF_meas (A_n) using a modelled conversion matrix $T(A_x \to A_n)$.

A similar approach can be used for interpolation, using two measurements $SRF_{meas}(A_r)$ and $SRF_{meas}(A_s)$, in the following steps:
calculate the theoretical response matrices for $A_x$, $A_r$ and $A_s$: $SRF_{mod}(A_x)$, $SRF_{mod}(A_r)$, $SRF_{mod}(A_x)$;
calculate the respective conversion matrices:

$$T(A_x \to A_r) = (SRF_{mod}(A_r))^{-1} * SRF_{mod}(A_x)'$$

$$T(A_x \to A_s) = (SRF_{mod}(A_s))^{-1} * SRF_{mod}(A_x)'$$

calculate the two corresponding (independent) estimates:

$$SRF_{est,r}(A_x) = T(A_x \to A_r) * SRF_{meas}(A_r)$$

$$SRF_{est,s}(A_x) = T(A_x \to A_s) * SRF_{meas}(A_s)$$

In practice, the two estimates will not yield identical results. To interpolate between the two estimates, we first choose an interpolation variable V(A,b) which is a function of the aperture and can also be a function of the spectral band (b). For every spectral band (b), a suitable linear combination of the responses may be calculated as $$EST(A_x)(b) = f \cdot SRF_{est,r}(A_x) + (1-f) \cdot SRF_{est,s}(A_x),$$

with $f = (V(A_s,b) - V(A_x,b))/(V(A_s,b) - V(A_r,b))$.

For V(A,b), the simplest choice is the aperture itself V(A,b)=A. In a preferred implementation we use the full width half max of the filter response peak: V(A,b)=FWHM (A,b). Its value differs per spectral band (b).

The final estimated response matrix $SRF_{est}(A_x)$ is formed by the set of individual spectral band responses $SRF_{est}(A_x)$ (b).

Figure 6:
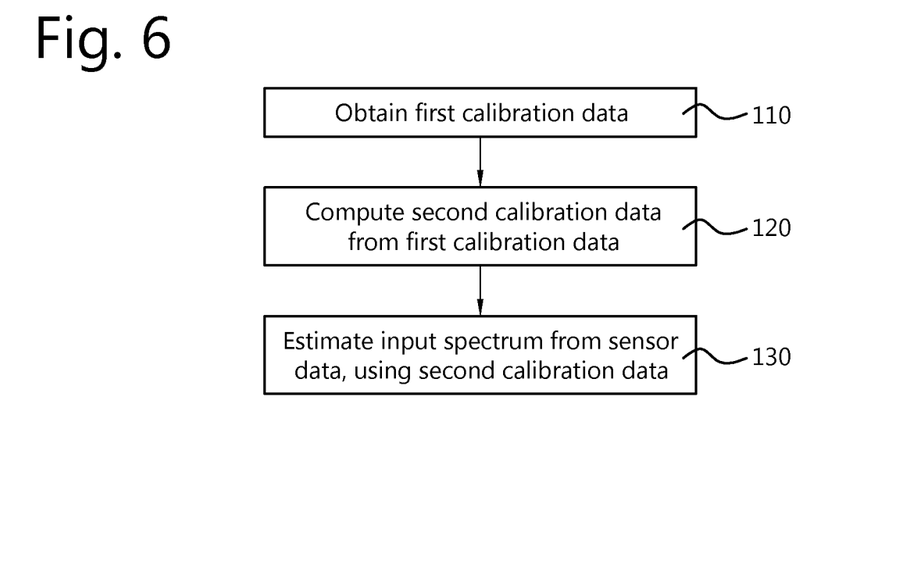
FIG. 6 provides a flow chart of a method according to an embodiment of the present invention.
Figure 7:
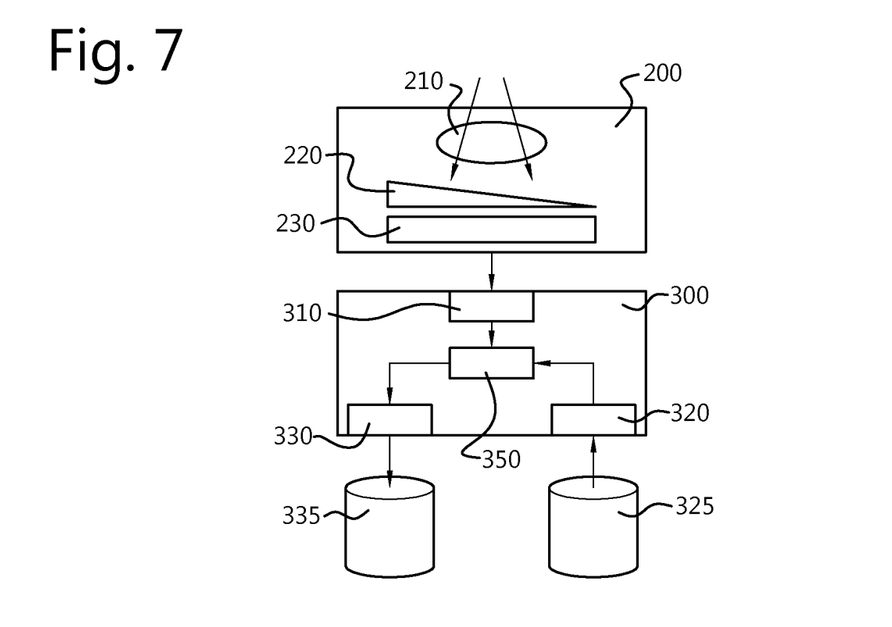
FIG. 7 schematically illustrates a system according to an embodiment of the present invention.

FIG. 6 provides a flow chart of a method according to an embodiment of the present invention. Where references is made to parts of the optical sensor assembly, reference numbers as indicated in FIG. 7 will be used. The illustrated method estimates an input spectrum from sensor data acquired by means of an optical sensor assembly 200, the optical sensor assembly comprising an aperture 210, a Fabry-Perot interferometer 220, and an optical sensor element 230.

In a first step 110 of the illustrated method, first calibration data, representative of a spectral response function of the optical sensor assembly 200 for a first setting of the aperture 210, is obtained. The obtaining of the first calibration data 110 may comprise the actual calibration, i.e. measuring a spectral response of the optical sensor assembly 200 to a plurality of calibrated light sources for the first setting of the aperture 210. However, the calibration may also have taken place at a different time, and the obtaining of the first calibration data 110 may in such case comprise retrieving the data from a memory, a storage medium, or a network.

In a second step 120 of the illustrated method, second calibration data is computed from the first calibration data, the second calibration data being representative of a spectral response function of the optical sensor assembly 200 for a second setting of the aperture 210 (this second setting corresponding to the setting applied during the acquiring of the sensor data). As explained hereinabove in connection with Equation 6, the first calibration data may be represented as a first matrix, and the computing of the second calibration data 120 may comprise performing a matrix multiplication on the first matrix to obtain a second matrix representing the second calibration data. In particular, this step may involve a multiplication by a matrix Tx as defined in Equation 10.

In a third step 130 of the illustrated method, the input spectrum is estimated as a function of the second calibration data and the sensor data. This may be achieved by applying Equations 7-9 as explained in more detail above.

The Fabry-Perot interferometer 220 may comprise a plurality of parts with different spectral properties overlaying respective regions of the sensor element 230, as is the case for a multispectral or hyperspectral sensor. The obtaining of the first calibration data 110 may in such case comprise obtaining respective calibration data sets for the plurality of regions.

The present invention also pertains to a computer program product comprising code means configured to instruct a processor to carry out the steps of the method described above. The computer program product may be provided on a computer-readable medium, such as a magnetic disc, an optical disc, or a semiconductor memory; or it may be made provided via a network, such as a local area network, a storage area network or the Internet, where it may be available for download and local installation, or provided as a software-as-a-service (SaaS) offering.

FIG. 7 schematically illustrates a system according to an embodiment of the present invention. The system operates on sensor data acquired by an optical sensor assembly 200, which may be integrated with the system. The optical sensor assembly 200 comprises an aperture 210, a Fabry-Perot interferometer 220, and an optical sensor element 230.

The system comprises interfacing means 310, 320 configured for acquiring the sensor data, and first calibration data 110 representative of a spectral response function of the optical sensor assembly 200 for a first setting of the aperture 210. The term "interfacing means" designates the necessary hardware and software to communicate with another entity capable of providing or accepting data. Preferably, such hardware and software operates according to accepted industry standards. Accordingly, the physical and data link layer aspects of the interfacing means may operate in accordance with standards such as IEEE Std 802.3 (Ethernet), IEEE Std 802.11 (Wireless LAN), USB, and the like. The network and transport layer aspects of the interfacing means may operate in accordance with the TCP/IP protocol stack. The various interfaces mentioned herein (310, 320, 330) may share hardware and/or software.

The illustrated system further comprises processing means 350, operationally connected to said interfacing means 310, 320, configured for computing second calibration data 120 from the first calibration data, the second calibration data being representative of a spectral response function of the optical sensor assembly 200 for a second setting of the aperture 210, wherein the second setting corresponds to a setting applied during the acquiring of the sensor data. The processing means 350 are further configured for estimating the input spectrum 130 as a function of the second calibration data and the sensor data. As for the computational aspects of these operations, reference is made for the detailed description given above.

The processing means 350 may be implemented in dedicated hardware (e.g., ASIC), configurable hardware (e.g., FPGA), programmable components (e.g., a DSP or general purpose processor with appropriate software), or any combination thereof. The same component(s) may also include other functions.

The input of the first calibration data is schematically illustrated as originating from external storage 325, connected to an interface 320 of the system. Likewise, the output of the estimated input spectrum is schematically illustrated as being sent to external storage 335, connected to an interface 330 of the system. This is done for illustrative purposes only; the skilled person will appreciate that the input and output of the system may also occur in internal memory, local storage media, network-attached storage, other servers on a network, and the like.

While the invention has been described hereinabove with reference to separate system and method embodiments, this was done for clarifying purposes only. The skilled person will appreciate that features described in connection with the system or the method alone, can also be applied to the method or the system, respectively, with the same technical effects and advantages. Furthermore, the scope of the invention is not limited to these embodiments, but is defined by the accompanying claims.

The invention claimed is:

1. A method for correcting an acquired spectral image acquired by means of an optical sensor assembly, said optical sensor assembly comprising an aperture, a Fabry-Perot interferometer, and an optical sensor element, the method comprising:
   obtaining first calibration data representative of a spectral response function of said optical sensor assembly for a first setting of said aperture;
   changing an aperture size of the aperture to a second setting of said aperture;
   computing second calibration data of the second setting of said aperture from said first calibration data, said second calibration data being representative of a spectral response function of said optical sensor assembly for the second setting of said aperture that is different from the first setting of said aperture, wherein said second setting corresponds to a setting of the aperture applied during said acquiring of said acquired spectral image;
   estimating said input spectrum of the second setting of said aperture as a function of said second calibration data and said acquired spectral image; and
   correcting the acquired spectral image from the optical sensor assembly based on the estimated input spectrum to obtain corrected sensor data.

2. The method according to claim 1, wherein said obtaining of said first calibration data comprises measuring a spectral response of said optical sensor assembly to a plurality of calibrated light sources for said first setting of said aperture.

3. The method according to claim 1, wherein said Fabry-Perot interferometer comprises a plurality of parts with different spectral properties overlaying respective regions of said sensor element, and wherein said obtaining of said first calibration data comprises obtaining respective calibration data sets for said plurality of regions.

4. The method according to claim 1, wherein said first calibration data is represented as a first matrix, and wherein said computing of said second calibration data comprises performing a matrix multiplication on said first matrix to obtain a second matrix representing said second calibration data.

5. A computer program product comprising code means configured to carry out the method of claim 1.

6. A system for correcting an acquired spectral image acquired by means of an optical sensor assembly having an aperture, the system comprising:
   interfacing means configured for acquiring said acquired spectral image, and first calibration data representative of a spectral response function of said optical sensor assembly for a first setting of said aperture;
   changing means configured for changing an aperture size of the aperture to a second setting of said aperture; and
   processing means configured for computing second calibration data of the second setting of said aperture from said first calibration data, said second calibration data being representative of a spectral response function of said optical sensor assembly for the second setting of said aperture that is different from the first setting of said aperture, wherein said second setting corresponds to a setting of the aperture applied during said acquiring of said acquired spectral image; and for estimating said input spectrum of the second setting of said aperture as a function of said second calibration data and said acquired spectral image and for correcting the acquired spectral image from the optical sensor assembly based on the estimated input spectrum to obtain corrected sensor data.

7. The system according to claim 6, further comprising said optical sensor assembly, said optical sensor assembly comprising an aperture, a Fabry-Perot interferometer, and an optical sensor element.

8. A system for correcting an acquired spectral image acquired by an optical sensor assembly having an aperture, comprising:
   interfacing hardware configured for acquiring said acquired spectral image, and first calibration data representative of a spectral response function of said optical sensor assembly for a first setting of said aperture;
   changing hardware for changing an aperture size of the aperture to a second setting of said aperture; and
   processing hardware configured for computing second calibration data of the second setting of said aperture from said first calibration data, said second calibration data being representative of a spectral response function of said optical sensor assembly for the second setting of said aperture that is different from the first setting of said aperture, wherein said second setting corresponds to a setting of the aperture applied during said acquiring of said acquired spectral image; and for estimating said input spectrum of the second setting of said aperture as a function of said second calibration data and said acquired spectral image and for correcting the acquired spectral image from the optical sensor assembly based on the estimated input spectrum to obtain corrected sensor data.

* * * * *